US011982850B2

(12) United States Patent
Zhang et al.

(10) Patent No.: US 11,982,850 B2
(45) Date of Patent: May 14, 2024

(54) OPTICAL MICRO-ELECTROMECHANICAL SYSTEM WITH FLIP CHIP PACKAGING

(71) Applicant: ANYON TECHNOLOGIES PTE. LTD., Singapore (SG)

(72) Inventors: Hongbo Zhang, Singapore (SG); Hengjiang Ren, Singapore (SG); Jie Luo, Los Angeles, CA (US); Chenlu Wang, Singapore (SG)

(73) Assignee: ANYON TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 17/950,135

(22) Filed: Sep. 22, 2022

(65) Prior Publication Data

US 2024/0069292 A1    Feb. 29, 2024

(30) Foreign Application Priority Data

Aug. 25, 2022    (CN) .......................... 202211026950.2

(51) Int. Cl.
*G02B 6/122*  (2006.01)
*G02B 6/293*  (2006.01)
*G02B 6/42*   (2006.01)

(52) U.S. Cl.
CPC ......... *G02B 6/4215* (2013.01); *G02B 6/1225* (2013.01); *G02B 6/29335* (2013.01); *G02B 6/42* (2013.01); *G02B 6/4245* (2013.01)

(58) Field of Classification Search
CPC .................................................. G02B 6/1225
See application file for complete search history.

(56) References Cited

U.S. PATENT DOCUMENTS

| 2003/0123827 | A1* | 7/2003 | Salerno | ................. | B82Y 20/00 |
| | | | | | 385/27 |
| 2016/0202414 | A1* | 7/2016 | Englund | ............. | G02B 6/1225 |
| | | | | | 264/1.24 |
| 2016/0291265 | A1* | 10/2016 | Kinghorn | ............. | G02B 6/4238 |
| 2022/0356058 | A1* | 11/2022 | Painter | ................. | G11C 13/025 |

FOREIGN PATENT DOCUMENTS

CN               113805364 A    * 12/2021

* cited by examiner

*Primary Examiner* — Eric Wong
(74) *Attorney, Agent, or Firm* — IPRTOP LLC

(57) ABSTRACT

Several optical micro-electromechanical systems (OptoMEMS) are provided. One of the OptoMEMS comprises an OptoMEMS chip, and a photonic chip coupled to the OptoMEMS chip; wherein the OptoMEMS chip comprises a photonic cavity and a first platform on which the photonic cavity is fabricated, and the photonic chip comprises a waveguide and a second platform on which the waveguide is fabricated; wherein the photonic cavity comprises at least one dielectric beam, each of which further comprises at least one array of air holes; wherein the photonic cavity is at least partially made of a photonic crystal, and the lattice constant of the photonic crystal is reduced or increased gradually in a central region of the photonic cavity, allowing the light of a specific frequency to be trapped in the center region.

8 Claims, 9 Drawing Sheets

OPTICAL MICRO-ELECTROMECHANICAL SYSTEM WITH FLIP CHIP PACKAGING

FIELD OF TECHNOLOGY

The present disclosure generally relates to the field of optical sensors, in particular, to a flip-chip photonic structure evanescently coupled to a waveguide.

BACKGROUND

Optical sensors are highly demanded in consumer applications due to the rapid development in a wide range of Internet of Things (IoT) devices and virtual spaces, and they have advantages such as high resolution and fast response. However, the commercial market prefers cheap and small sensors. Optical micro-electromechanical systems (OptoMEMS) may hold the key towards highly integrated on-chip sensors, which are cheap and small. Realizing practical OptoMEMS not only necessitates the advance of individual OptoMEMS elements, but also requires Si-photonic platforms that interact with optical and electronic inputs. In particular, one fundamental sensing element for OptoMEMS is a suspended photonic cavity, and transporting light from the optical input to the suspended photonic cavity is critical.

The current packaging strategies of integrated OptoMEMS devices are immature, which is a significant problem limiting their development. Because OptoMEMS are not compatible with standard photonic integrated circuits, there are no standard procedures to assemble and package the silicon-based OptoMEMS devices. The introduction of the flip-chip packaging strategy is a vital factor leading to successful mass production of integrated electronic circuits, owing to the reduced cost, improved reliability, and high yield in packaging.

Separating the integrated photonic circuits and active elements of OptoMEMS will pave the way for photonic processing, assembling, and packaging strategies that are better standardized, thereby reducing costs and improving reliability.

SUMMARY

The present disclosure provides an optical micro-electromechanical system (OptoMEMS), including an OptoMEMS chip, and a photonic chip coupled to the OptoMEMS chip, wherein the OptoMEMS chip includes a photonic cavity and a first platform on which the photonic cavity is fabricated, and the photonic chip includes a waveguide and a second platform on which the waveguide is fabricated; wherein the photonic cavity includes at least one dielectric beam, each of which further includes at least one array of air holes; wherein the photonic cavity is at least partially made of a photonic crystal, and the lattice constant of the photonic crystal is reduced or increased gradually in a central region of the photonic cavity, allowing light of a specific frequency to be trapped in the center region.

The first platform may be one of a SiN-on-Si platform, a SiN-on-SiO2 platform, and a SOI platform, and the first platform is partially etched away to release the photonic cavity from the first platform.

The OptoMEMS chip and the photonic chip may be bonded through a silicon spacer, and there is a gap between the two chips.

The second platform may be a silicon-on-insulator (SOI) platform.

An insulator portion of the SOI platform may be partially etched away to release the waveguide from the second platform.

The photonic cavity may include two parallel dielectric beams that are substantially the same, and each of the two beams includes at least one array of air holes.

A width of the waveguide may be from 150 to 500 nm.

The OptoMEMS chip may be flipped upside-down and bonded to the photonic chip.

The present disclosure further discloses an OptoMEMS, including an OptoMEMS chip, and a photonic chip coupled to the OptoMEMS chip, wherein the OptoMEMS chip includes a first waveguide and a first platform on which the first waveguide is fabricated, and the photonic chip includes a second waveguide and a second platform on which the second waveguide is fabricated.

The first waveguide may be a suspended waveguide.

The first platform may be one of a SiN-on-Si platform, a SiN-on-SiO2 platform, and a SOI platform, and the first platform is partially etched away to release the first waveguide from the first platform.

The second platform may be a SOI platform, and an insulator portion of the second platform is partially etched away to release the second waveguide from the second platform.

The OptoMEMS chip may be flipped upside-down and bonded to the photonic chip.

DETAILED DESCRIPTION

Figure 1A:
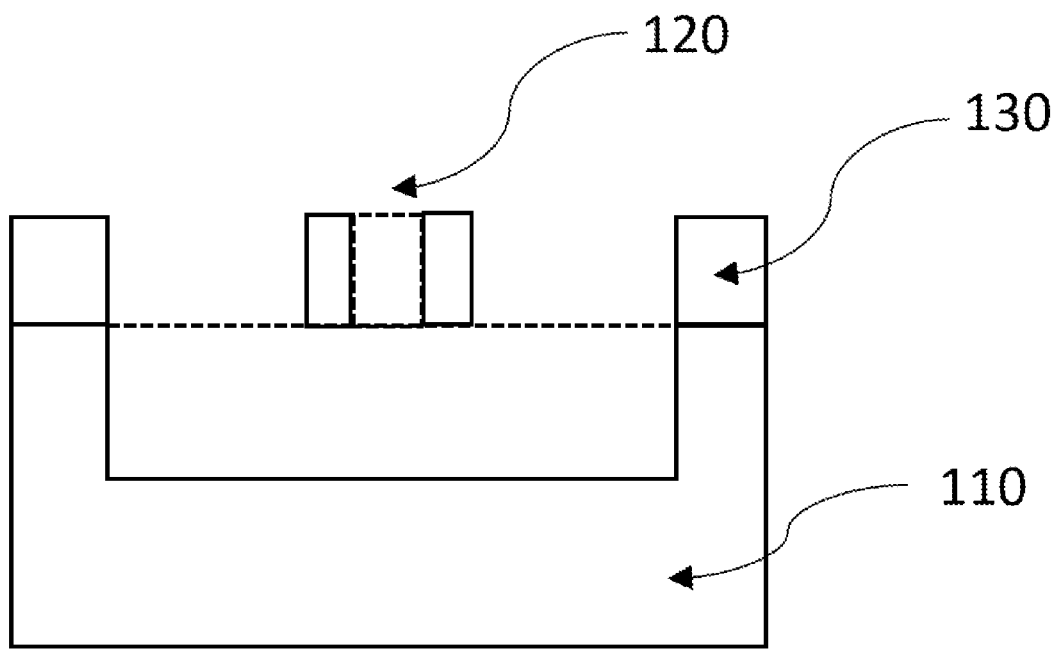
FIG. 1a is a side view of a single suspended SiN cavity on a SiN-on-Si platform according to one embodiment of the present disclosure.

One or more specific embodiments of the present disclosure will be described below. These described embodiments are only examples of the presently disclosed techniques, and are not intended to limit aspects of the presently disclosed invention. Additionally, in an effort to provide a concise description of these embodiments, all features of an actual implementation may not be described in the specification. It should be appreciated that in the development of any such actual implementation, numerous implementation-specific decisions must be made to achieve the developers' specific goals, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It should be noted that the drawings provided in this disclosure only illustrate the basic concept of the present invention in a schematic way, so the drawings only show the components related to the present invention. The drawings are not necessarily drawn according to the number, shape and size of the components in actual implementation; during the actual implementation, the type, quantity and proportion of each component can be changed as needed, and the components' layout may also be more complicated.

The terms regarding spatial relationships such as "lower," "below," "under," and "on," "above," etc., are used for convenience of description to describe the relationship of one element or feature to another element or feature in a figure. It should be understood that in addition to the orientation shown in the figure, the spatial relationship terms are intended to include different orientations during use and operation. For example, if the device in the figures is rotated, then what is described as "below" or "beneath" or "under" may become "on" or "above" or "over." Thus, the term "below" and "under" may include both upper and lower orientations. Devices may additionally be oriented differently (e.g., rotated 90 degrees or other orientations), and the spatial relationship used in this description are interpreted accordingly.

In addition, when a layer is referred to as being "between" two layers, it may be the only layer between the two layers, or one of a plurality of layers between the two layers.

The present disclosure relates to OptoMEMS, and features combining Si-based photonics technologies with a flip-chip packaging strategy, which enables the separation of mechanical elements and photonic elements onto two different chips. Such an arrangement provides more flexibility than traditional ones, because it takes advantage of silicon photonics and can be used to construct highly integrated OptoMEMS devices with large bandwidth, high-density, high-power efficiency, high yield in mass production, and low-cost manufacturing.

Currently, it is challenging to couple light from a waveguide to a suspended photonic cavity on a chip separated from the waveguide. Edge coupling and grating coupling are the most common methods employed for fiber-to-chip coupling and chip-to-chip coupling. However, both of them have limitations. For example, it is difficult to apply edge coupling to the coupling of an OptoMEMS chip to a photonic chip, due to the strict mode alignment of a waveguide on the photonic chip and a suspended cavity on the OptoMEMS chip, as required by edge coupling. Grating coupling is an alternative method, which couples a near-perpendicular incidence light to an on-chip coupler, and has the advantage of a high alignment tolerance. Nevertheless, its couple efficiency is relatively low (round trip efficiency less than −16 dB), and complicated processes are needed to integrate a grating coupler with suspended OptoMEMS structures, which increases cost and manufacturing process steps. In addition, because the suspended MEMS structures are not compatible with conventional coupling structures, like edge couplers and grating couplers, they usually require an additional waveguide to subsequently direct light to the optical cavity, which further increases the round trip loss.

Therefore, it is of significant importance to develop a compatible methodology for efficient coupling of OptoMEMS structures and photonic circuits. Herein, the present disclosure provides a flip-chip evanescent coupling scheme to couple light from a photonic waveguide to a suspended cavity as optical output and input.

The flip-chip bonding technique has been used to bond electronic chips in the industry. Some efforts have been made to achieve flip-chip integrated photonics, but they all require a top waveguide to be firmly attached to a bottom waveguide, and are not applicable to coupling a suspended cavity to a photonic waveguide beneath the cavity.

An evanescent coupling scheme can be used for coupling a suspended cavity to a photonic waveguide when the two are on two separated chips, which makes this scheme highly compatible with the flip-chip packaging strategy. Evanescent coupling is of particular significance for applications such as direct interface with external optical systems through fiber tapers, and energy exchange between nanowires and ring resonators. When it comes to the packaging and assembling of OptoMEMS devices, the flip-chip packaging strategy can provide a lot of flexibility, which will boost their development.

In the coupling scheme of the present disclosure, the mode in the suspended structure (i.e., a photonic crystal cavity or a waveguide) evanescently couples into a waveguide on a separated chip, and the OptoMEMS chip is flipped and placed face-to-face with the photonic chip. Evanescent coupling is an attractive choice for flip-chip bonding because the former combines distinct advantages of both edge coupling and grating coupling, providing a low loss, broadband, and low-polarization sensitive coupling scheme with a high alignment tolerance.

In the present disclosure, the waveguide used for coupling only requires one photo-lithography process, which substantially simplifies the fabrication process and reduces the cost. Also, unlike grating coupling and edge coupling, no additional tapered waveguide is needed in the present disclosure, which prevents unnecessary waveguide loss on the OptoMEMS chip.

Embodiment 1

Embodiment 1 of the present disclosure provides a suspended photonic structure and a waveguide that are coupled together.

The suspended photonic structure may be made from a photonic crystal, which is so designed that it is able to modify flow of light rays with periodic structures of dielectric materials. The suspended photonic structure includes a single-beam photonic crystal cavity. The single-beam photonic crystal cavity includes a dielectric beam with periodic arrays of air holes. The dielectric beam is made of, for example, silicon (Si), or silicon nitride (SiN). The linear array of air holes includes photonic crystal periodic holes, and can block light of a specific frequency. Subsequently, the lattice constant of the photonic crystal (i.e., spacing between the holes) is reduced or increased gradually in a central region of the photonic cavity, allowing light of a specific frequency to be "trapped" in the center region. Two ends of the dielectric beam act as mirrors to reflect the light. The central region with a reduced or increased lattice constant is usually called a "defect" region.

As an example, the single-beam photonic crystal cavity is a suspended SiN photonic cavity on a flipped OptoMEMS chip (hereinafter, SIN cavity), and a waveguide is a silicon waveguide on a photonic chip (hereinafter, silicon waveguide). As shown in FIG. 1a, the SiN cavity 120 is fabricated on a SiN-on-Si platform, and includes arrays of air holes 121, and silicon 110 underneath the SiN cavity 120 is etched so as to release the SiN cavity 120 from the other parts of the SiN-on-Si platform, at which point the SiN cavity becomes "suspended", hence its name. The SiN-on-Si platform that includes the suspended SiN cavity 120 is hereinafter called a SiN-on-Si chip. The cavity may also be fabricated on a SiN-on-SiO$_2$ platform, or a silicon-on-insulator (SOI) platform.

Figure 1B:
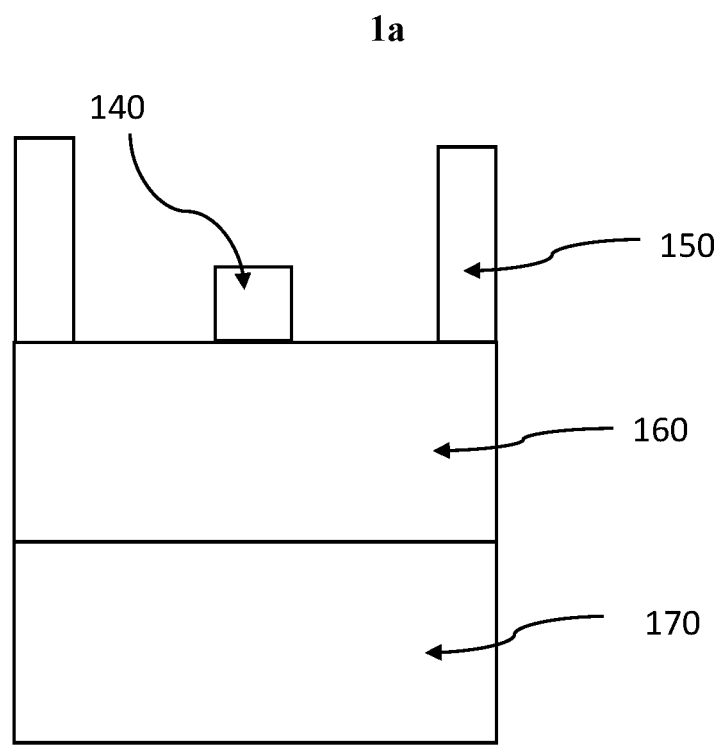
FIG. 1b is a side view of a single waveguide on a SOI platform according to one embodiment of the present disclosure.

As shown in FIG. 1b, the silicon waveguide 140 is fabricated on a SOI platform including a SiO$_2$ layer 160, and a Si substrate 170, as a part of a photonic circuit. In one example, the platform is a standard SOI platform. The SOI platform that includes the silicon waveguide 140 is hereinafter called a SOI chip.

Figure 1C:
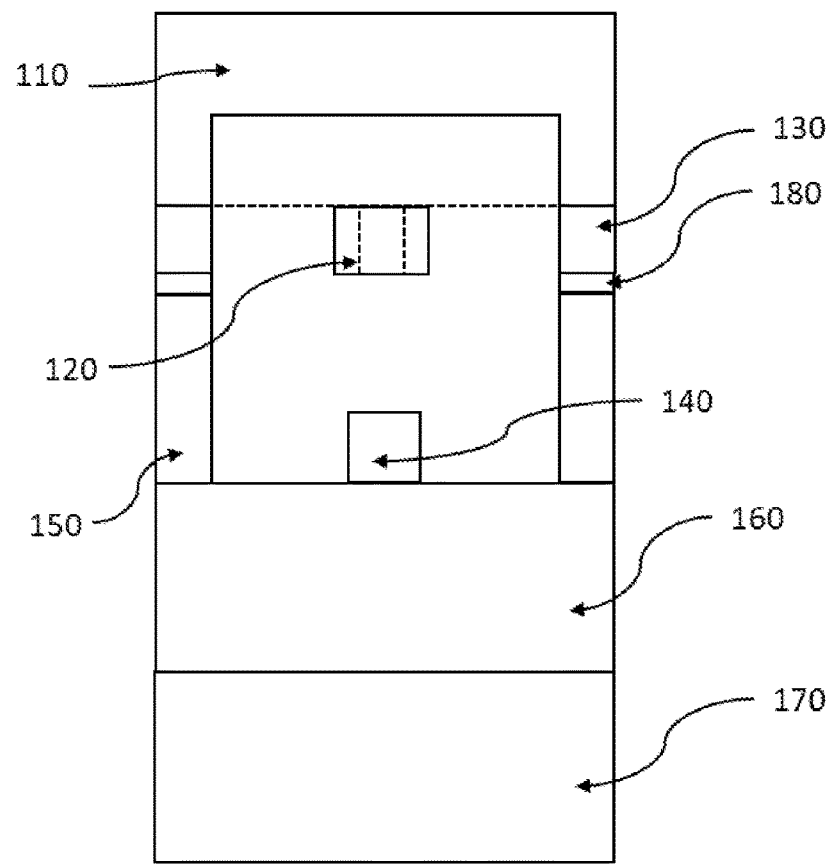
FIG. 1c is a side view showing flip-chip evanescent coupling between the single suspended SiN cavity on the SiN-on-Si platform and the Si waveguide on the SOI platform according to one embodiment of the present disclosure.

As shown in FIG. 1c, the SiN-on-Si chip is flipped upside-down and then bonded by bonding bumps 180 to the SOI chip, with a silicon spacer 150 between the two chips. The silicon spacer 150 is made of silicon, and is higher than the silicon waveguide 140, as show in FIG. 2b. Optionally, there is also a SiN spacer 130 between the two chips, and the SiN spacer 130 is made of SiN. The silicon waveguide 140 is placed below the SiN cavity 120 and there is a gap between the two, resulting in a flip-chip coupling system. As the width of the silicon waveguide 140 is optimized near the coupling region between the two chips, the light evanescently expands out of the waveguide 140. Because the width of the silicon waveguide 140 is reduced, the optical mode profile of the silicon waveguide 140 is enlarged to overlap with the mode profile of the cavity 120, at which point the waveguide 140 is coupled with the cavity 120. The light is detectable at one end of the silicon waveguide 140. An extrinsic coupling rate of the cavity to the silicon waveguide 140, $\kappa_e$, is determined by the size of the gap between the center of the silicon waveguide 140 and the center of the SiN photonic cavity 120.

Figure 1D:
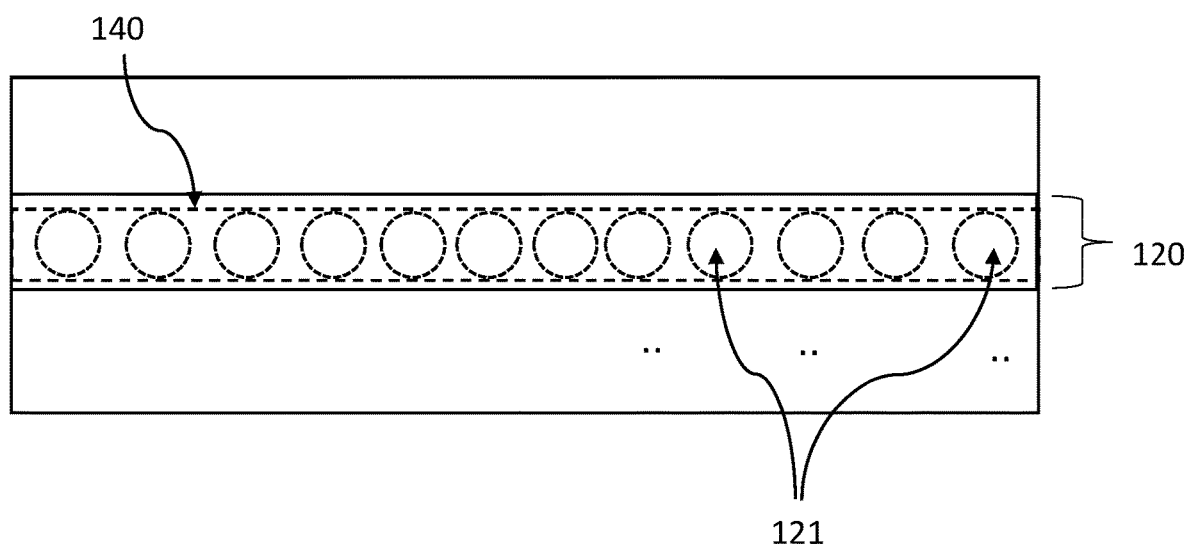
FIG. 1d is a top view showing the flip-chip evanescent coupling between the single suspended SiN cavity and the Si waveguide according to one embodiment of the present disclosure.

FIG. 1d is a top view showing the flip-chip evanescent coupling between the single suspended SiN cavity 120 on the SiN-on-Si platform and the Si waveguide 140 on the SOI platform. Silicon 110, the spacers, and the bonding bumps 180 are not shown in FIG. 1d. The Si waveguide 140 is positioned under the suspended SiN cavity 120 to form a flip-chip bonding scheme.

Figure 1E:
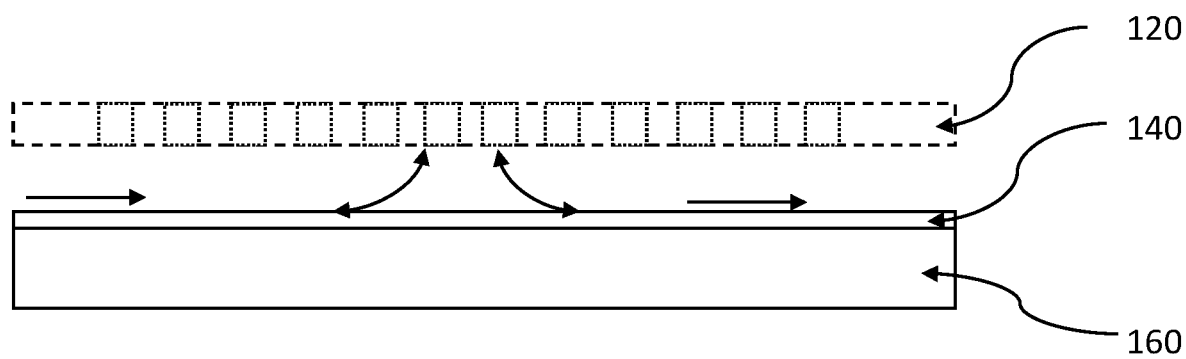
FIG. 1e is a front view showing the flip-chip evanescent coupling between the single suspended SiN cavity and the Si waveguide according to one embodiment of the present disclosure.

FIG. 1e is a front view showing the flip-chip evanescent coupling between the single suspended SiN cavity 120 on the SiN-on-Si platform and the Si waveguide 140 on the SOI platform. The arrows represent the light with a certain frequency that is allowed to be coupled into and out of the cavity via the Si waveguide 140 on the SOI chip.

Embodiment 2

Embodiment 2 provides a suspended zipper cavity 220 and waveguide 240 that are coupled together.

The zipper cavity 220 includes two parallel beams 225 that are substantially identical (which is why it is called a "zipper" cavity), and the two beams' optical modes are respectively positioned in the evanescent field of one another, which leads to the overlap of their optical modes. For light of a certain frequency, its electric field energy is concentrated in a gap between the two beams 225, and the coupling of the optical modes produces a super-mode at the center of the gap. The coupling scheme of this embodiment can be used to couple the light with the certain frequency into and out of the suspended zipper cavity 220 via the waveguide 240.

Figure 2A:
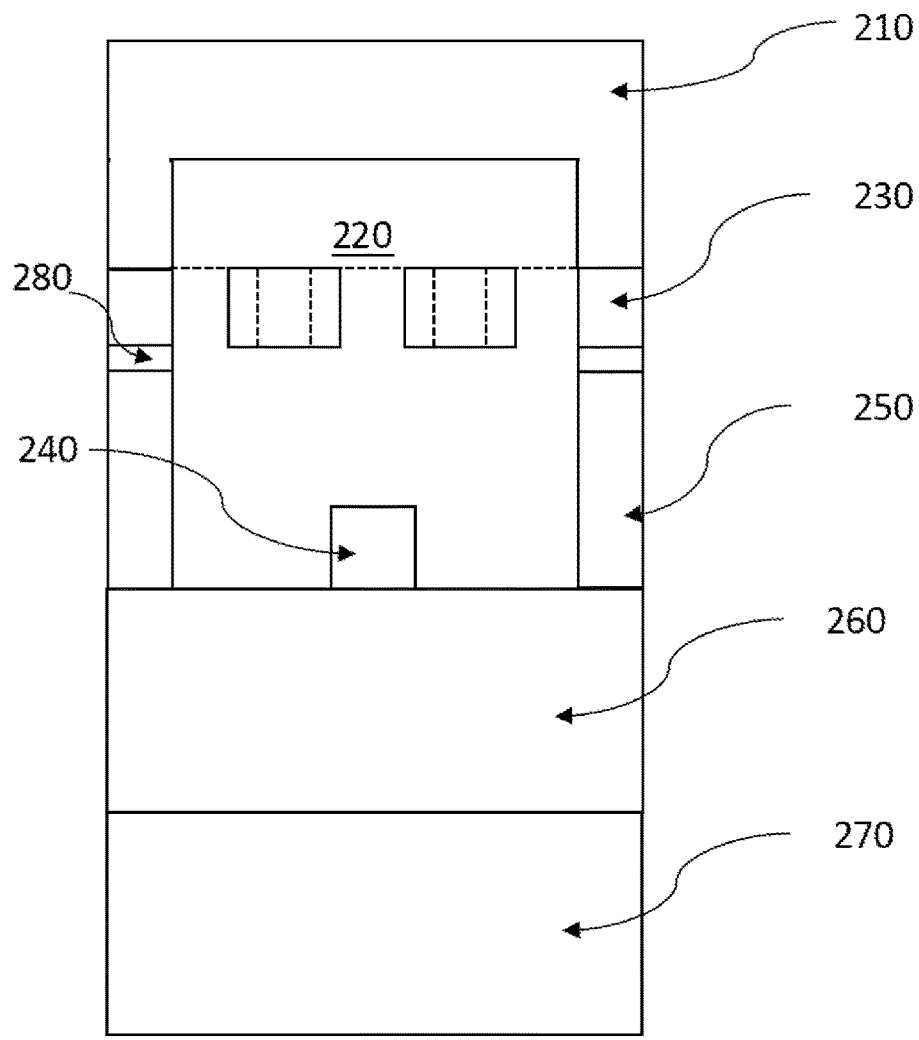
FIG. 2a is a side view showing flip-chip evanescent coupling between a zipper cavity on a SiN-on-Si platform and a Si waveguide on a SOI platform according to one embodiment of the present disclosure.

As an example, the zipper cavity 220 is a suspended SiN zipper cavity on a flipped OptoMEMS chip, and the waveguide 240 is a silicon waveguide on a photonic chip, as shown in FIG. 2a.

Figure 2B:
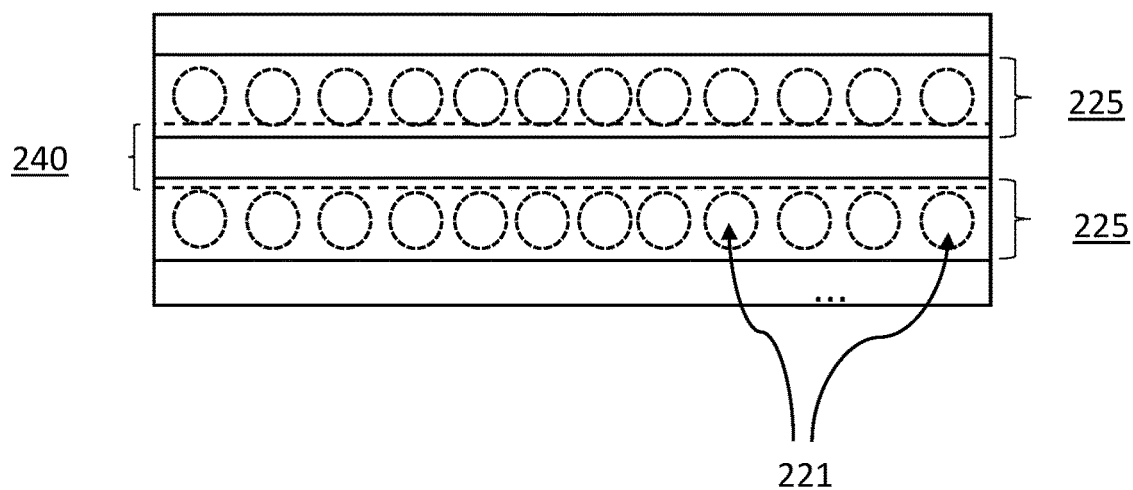
FIG. 2b is a top view showing the flip-chip evanescent coupling between the zipper cavity and the Si waveguide according to one embodiment of the present disclosure.

The suspended SiN zipper cavity 220 is fabricated on a SiN-on-Si platform; and each of its two beams 225 includes a linear array of air holes 221, as shown in FIG. 2b. Silicon 210 underneath the zipper cavity 220 is etched to release the SiN zipper cavity 220 from the other parts of the SiN-on-Si platform, at which point the SiN zipper cavity 220 becomes "suspended". The SiN-on-Si platform that includes the suspended SiN zipper cavity 220 is hereinafter called a SiN-on-Si chip. The cavity 220 may also be fabricated on a SiN-on-SiO$_2$ platform, or a SOI platform.

The silicon waveguide 240 is fabricated on a standard SOI platform including a SiO$_2$ layer 260 and a Si substrate 270, as a part of a photonic circuit. The SOI platform that includes the silicon waveguide 240 is hereinafter called a SOI chip.

As shown in FIG. 2a, the SiN-on-Si chip is flipped upside-down and then bonded by bonding bumps 280 to the SOI chip with a silicon spacer 250 and a SiN spacer 130 between the two chips. The silicon waveguide 240 is placed below and adjacent to the zipper cavity 220, and there is a gap between the two, resulting in a flip-chip coupling system. As the width of the silicon waveguide 240 is optimized near the coupling region between the two chips, the light evanescently expands out of the waveguide 240. Because the width of the silicon waveguide 240 is reduced, the optical mode profile of the waveguide 240 is enlarged to overlap with the mode profile of the cavity 220. The light is detectable at one end of the silicon waveguide 240. An extrinsic coupling rate of the zipper cavity 220 to the silicon waveguide 240, $\kappa_e$, is determined by the size of the gap between the center of the silicon waveguide 240 and the center of the zipper cavity 220.

The center of the silicon waveguide 240 is below the center of the suspended zipper cavity 220, as shown in FIG. 2b, where the distance between the two is controlled by the spacers and/or bonding bumps 280. In one example, the boding bumps bond the silicon spacer 250 to the SiN spacer 230, which are next to the suspended zipper cavity 220.

Figure 2C:
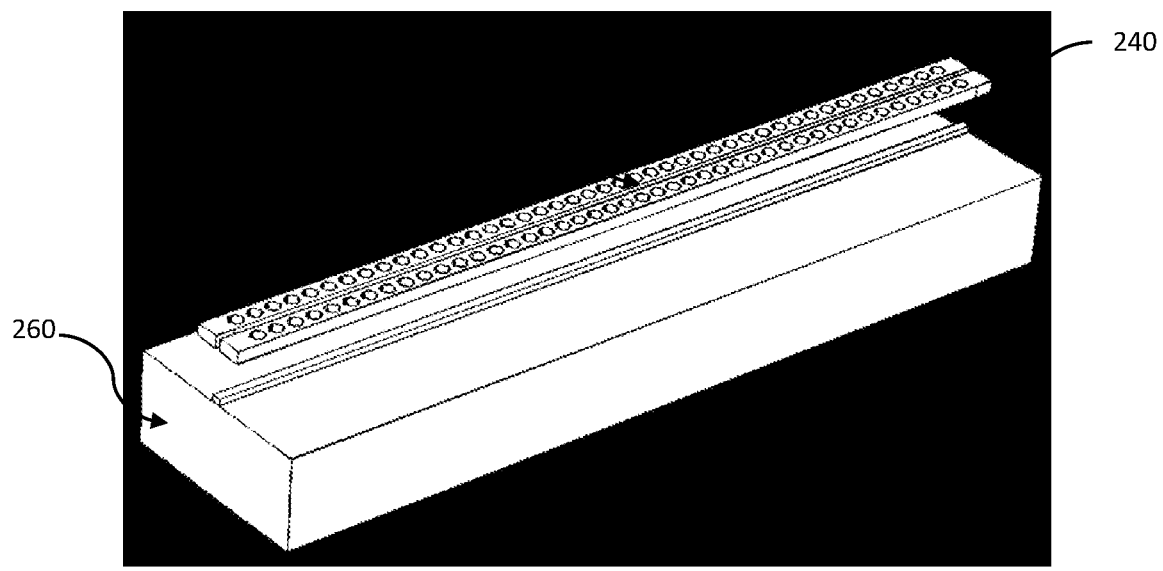
FIG. 2c is an exemplary 3D model showing the zipper cavity and a SOI chip, including the silicon waveguide according to one embodiment of the present disclosure.

FIG. 2c is a 3D model showing the zipper cavity 220 and the SOI chip.

Embodiment 3

In order to improve coupling efficiency and mismatching tolerance, in embodiment 3, the silicon waveguide beneath the cavity can also be released and suspended, which can increase the mode profile and prevent the light from extending to the $SiO_2$ layer.

Figure 3A:
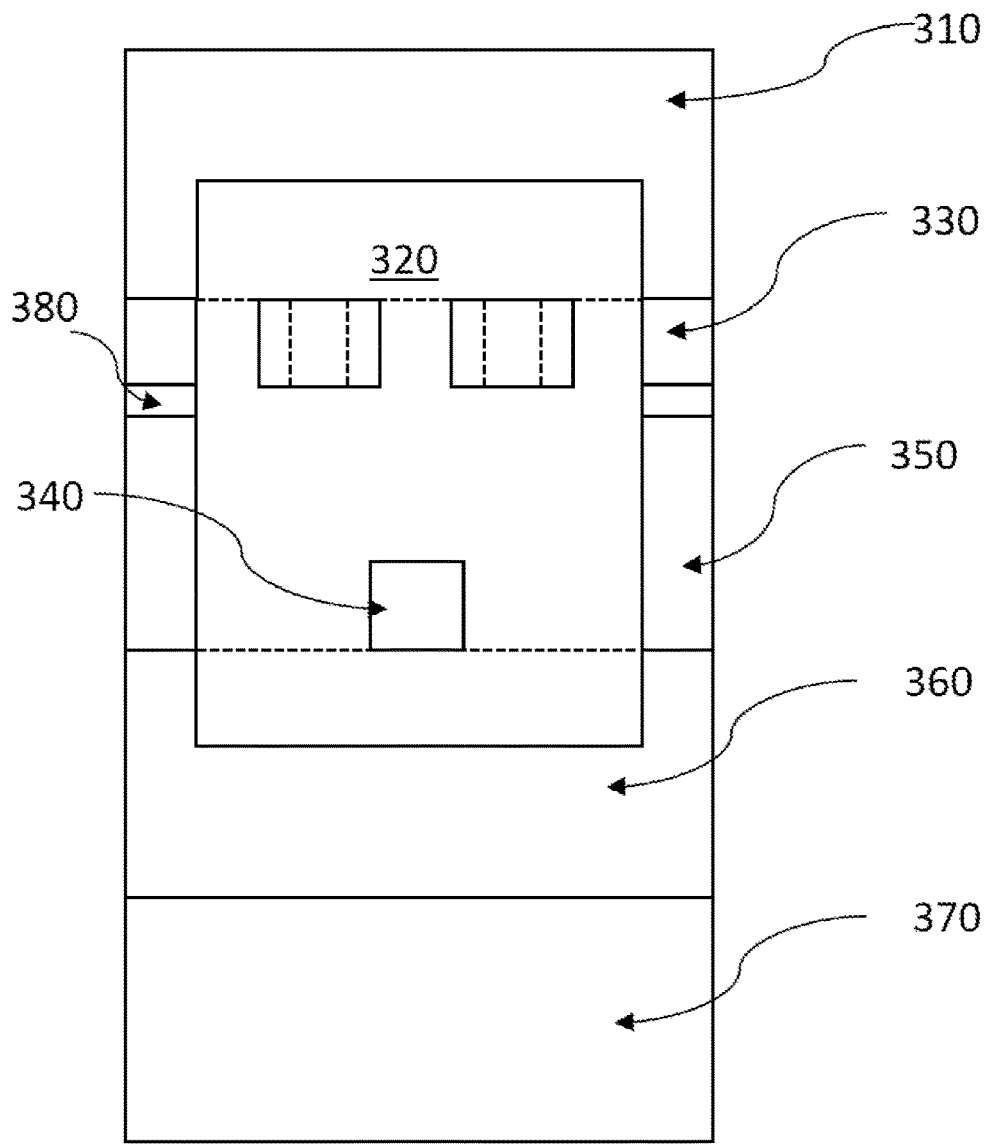
FIG. 3a is a side view showing flip-chip evanescent coupling between a suspended zipper cavity on a SiN-on-Si platform and a suspended Si waveguide on a SOI platform according to one embodiment of the present disclosure.
Figure 3B:
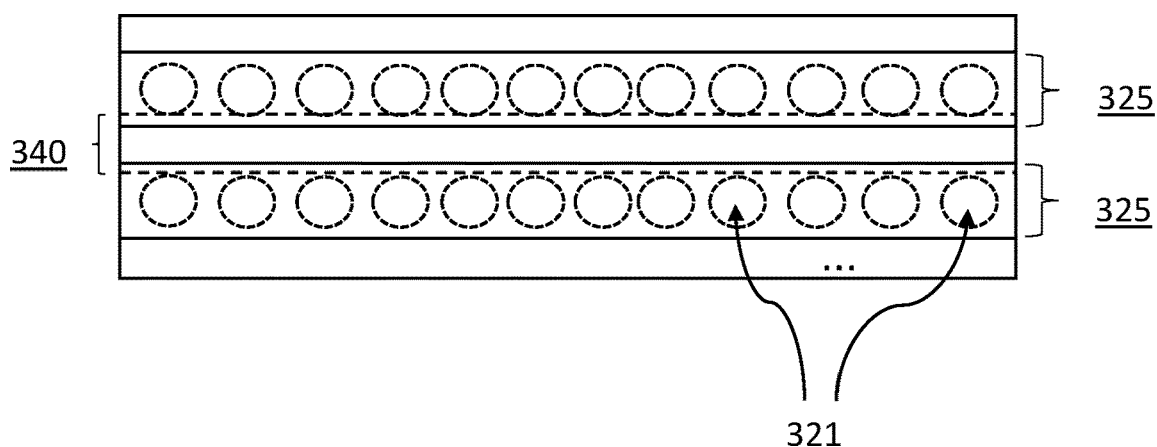
FIG. 3b is a top view of the flip-chip evanescent coupling between the suspended zipper cavity and the suspended Si waveguide according to one embodiment of the present disclosure.

As shown in FIG. 3a, embodiment 3 provides a suspended zipper cavity 320 on a SiN-on-Si chip, which is coupled to a suspended silicon waveguide 340 on a SOI chip. The suspended SiN zipper cavity 320 is fabricated on a SiN-on-Si platform, and includes two parallel beams 325 that are substantially identical. Each of the two beams 325 includes at least one periodic array of air holes 321, as shown in FIG. 3b. As shown in FIG. 3a, silicon 310 underneath the zipper cavity is etched away to release the SiN zipper cavity 320 from the other parts of the SiN-on-Si platform, at which point the SiN zipper cavity 320 becomes "suspended". The SiN-on-Si platform that includes the suspended SiN zipper cavity 320 is hereinafter called a SiN-on-Si chip. The cavity 320 may also be fabricated on a SiN-on-$SiO_2$ platform, or a SOI platform.

The silicon waveguide 340 is fabricated on a standard SOI platform, as a part of a photonic circuit. $SiO_2$ 360 underneath the silicon waveguide 340 is etched away to release the silicon waveguide 340, at which point the silicon waveguide 340 becomes "suspended". The SOI platform that includes the suspended silicon waveguide 340 is hereinafter called a SOI chip.

As shown in FIG. 3a, the SiN-on-Si chip is flipped upside-down and then bonded by bonding bumps 380 to the SOI chip with a silicon spacer 350 and a SiN spacer 330 between the two chips. The silicon waveguide 340 is placed below and adjacent to the zipper cavity 320, and there is a gap between the two, resulting in a flip-chip coupling system. As the width of the silicon waveguide 340 is optimized near the coupling region, the light evanescently extends outside of the waveguide 340. Because the width of the silicon waveguide 340 is reduced, the optical mode profile of the waveguide 340 is enlarged to overlap with the mode profile of the cavity 320. The light is detectable at one end of the silicon waveguide 340. An extrinsic coupling rate of the zipper cavity 320 to the silicon waveguide 340, $\kappa_e$, is determined by the size of the gap between the center of the silicon waveguide 340 and the center of the zipper cavity 320.

The center of the silicon waveguide 340 is below the center of the suspended zipper cavity 320, as shown in FIG. 3b.

Figure 3C:
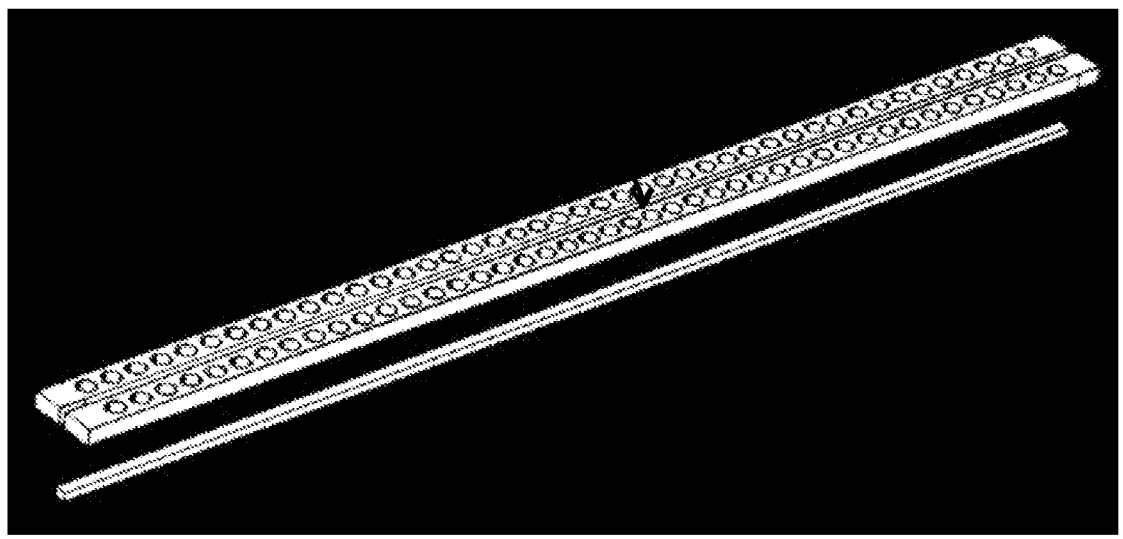
FIG. 3c is an exemplary 3D model showing the flip-chip evanescent coupling between the suspended zipper cavity and the suspended Si waveguide according to one embodiment of the present disclosure.

FIG. 3c is a 3D model of the suspended zipper cavity 320 and the suspended silicon waveguide 340.

The distance between the silicon waveguide 340 and the zipper cavity 320 is controlled by the spacers and/or the bonding bumps 380. In one example, the boding bumps 380 bond the silicon spacer 350 to the SiN spacer 330, which is next to the suspended zipper cavity 320. The coupling rate can be continuously tuned by altering the distance.

The width of the silicon waveguide 340 can also adjust the coupling rate. For example, when the width of the silicon waveguide 340 varies from 250 to 350 nm, the coupling rate ($\kappa_e/2\pi$) first increases and then decreases, with a maximum at about 280 nm (not necessarily applicable to all the embodiments, where the maximum point falls within the range of 150 nm to 500 nm). Generally, the width of the waveguide 340 can be optimized to a specific value, where the mode profile of the waveguide 340 matches with the mode profile of the cavity 320 with maximum mode overlap.

Embodiment 4

Besides direct coupling of a suspended cavity and a dielectric waveguide on separated chips, the flip-chip evanescent coupling scheme of the present disclosure can be applied to coupling between a suspended waveguide 420 on an OptoMEMS platform to a dielectric waveguide 440 on a photonic platform, which provides more flexibility when it comes to coupling optical waves into the OptoMEMS system and guiding optical waves back to a photonic circuit in a controllable manner.

Figure 4:
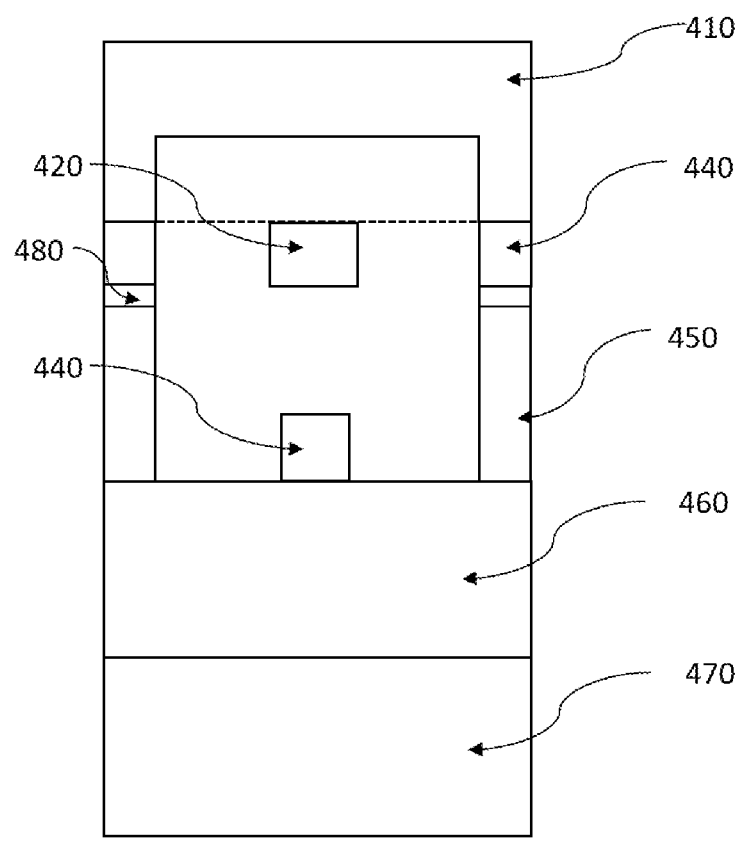
FIG. 4 is a side view showing evanescent field coupling between a suspended SiN waveguide on a SiN-on-Si platform and a Si waveguide on a SOI platform according to one embodiment of the present disclosure.

As shown in FIG. 4, in one example, the suspended waveguide 420 is a suspended SiN waveguide, and the dielectric waveguide 440 is a silicon waveguide.

The suspended SiN waveguide 420 is fabricated on a SiN-on-Si platform, and is released by etching silicon 410 underneath it. The SiN-on-Si platform that includes the suspended SiN waveguide 420 is hereinafter called a SiN-on-Si chip. The suspended waveguide 420 may also be fabricated on a SiN-on-$SiO_2$ platform, or a SOI platform.

The silicon waveguide 440 is fabricated on a standard SOI platform including a $SiO_2$ layer 460 and a Si substrate 470, as a part of a photonic circuit. The silicon waveguide 440 is controllably positioned in the near-field of the suspended SiN waveguide 420 to allow for evanescent coupling. The SOI platform that includes the silicon waveguide 440 is hereinafter called a SOI chip.

As shown in FIG. 4, the SiN-on-Si chip is flipped upside-down and then bonded to the SOI chip with a silicon spacer 450 and a SiN spacer 430 between the two chips. The silicon waveguide 440 is placed below and adjacent to the suspended waveguide 420, and there is a gap between the two, resulting in a flip-chip coupling system. As the width of the silicon waveguide 440 is optimized near the coupling region, the light evanescently extends outside of the waveguide 440. Because the width of the silicon waveguide 440 is reduced, the optical mode profile of the silicon waveguide 440 is enlarged to overlap with the mode profile of the SiN waveguide 420. An coupling rate of the SiN-waveguide-to-silicon-waveguide coupling, $\kappa_e$, can be continuously tuned by altering the distance between the silicon waveguide 440 and the SiN waveguide 420. The silicon waveguide 440 is located below the SiN waveguide 420, and the distance between the two is determined by the spacers and/or the bonding bumps 480.

Embodiment 5

The flip evanescent coupling scheme of the present disclosure also can be applied to the coupling between a top suspended waveguide on an OptoMEMS platform and a bottom suspended waveguide on a photonic platform, thereby reducing the light extending to the buried-oxide layer, and in turn increasing of the coupling rate.

Figure 5:
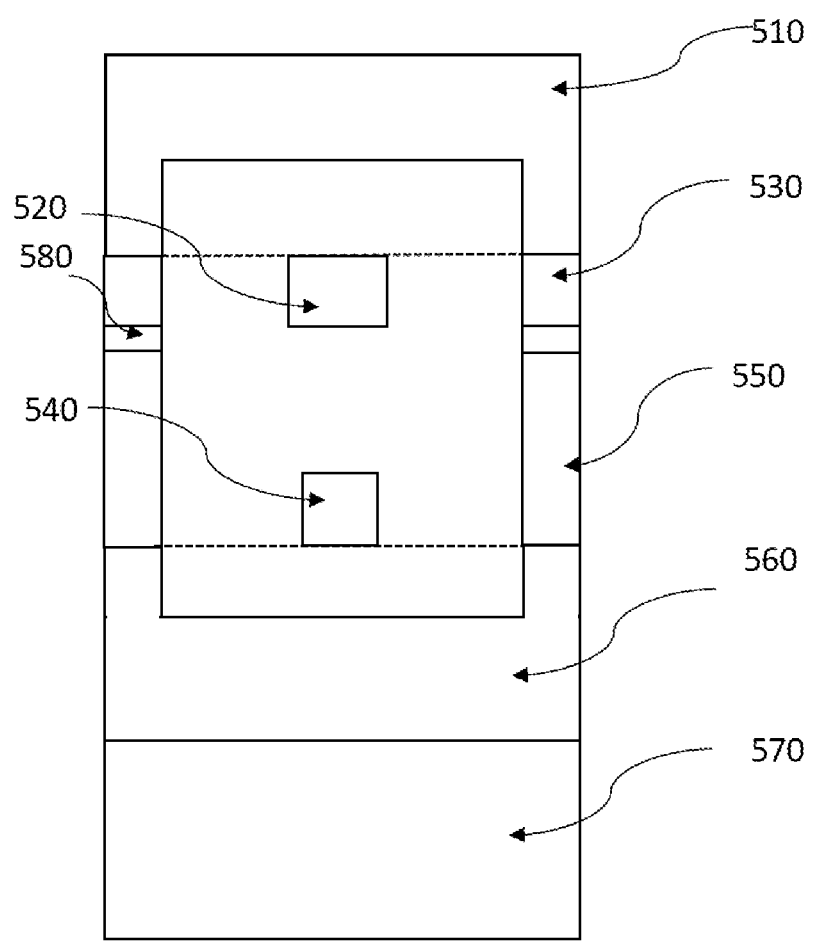
FIG. 5 is a side view showing evanescent field coupling between a suspended SiN waveguide on a SiN-on-Si platform and a suspended Si waveguide on a SOI platform according to one embodiment of the present disclosure.

As shown in FIG. 5, in one example, the top suspended waveguide 520 is a SiN waveguide, fabricated on a SiN-on-Si platform, and is released by etching silicon 510 underneath it. The SiN-on-Si platform that includes the top suspended SiN waveguide 520 is hereinafter called a SiN-on-Si chip. The top suspended waveguide 520 may also be fabricated on a SiN-on-$SiO_2$ platform, or a SOI platform.

The bottom suspended waveguide 540 is a silicon waveguide, fabricated on a standard SOI platform and subsequently released by etching $SiO_2$ 560 underneath it. The bottom suspended waveguide 540 is controllably positioned in the near-field of the top suspended waveguide 520 to allow for evanescent coupling. The SOI platform that includes the silicon waveguide 540 (i.e., the bottom suspended waveguide), the $SiO_2$ 560 and a Si substrate 570 is hereinafter called a SOI chip.

The SiN-on-Si chip is flipped upside-down and bonded to the SOI chip with a silicon spacer 550 and a SiN spacer 530 between the two chips. As the width of the silicon waveguide 540 is optimized near the coupling region, the light evanescently extends outside of the waveguide 540. Because the width of the silicon waveguide 540 is reduced, the optical mode profile of the silicon waveguide 540 is enlarged to overlap with the mode profile of the SiN waveguide 520. A coupling rate of the SiN-waveguide-to-silicon-waveguide coupling, $\kappa_e$, can be continuously tuned by altering the distance between the silicon waveguide 540 and the SiN waveguide 530. The silicon waveguide 540 is located below the SiN waveguide 520, and the distance between the two is determined by the spacers and/or bonding bumps 580.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. An optical micro-electromechanical system (OptoMEMS), comprising an OptoMEMS chip, and a photonic chip coupled to the OptoMEMS chip,
   wherein the OptoMEMS chip comprises a photonic cavity and a first platform on which the photonic cavity is fabricated, and the photonic chip comprises a waveguide and a second platform on which the waveguide is fabricated;
   wherein the photonic cavity comprises at least one dielectric beam, each of which further comprises at least one array of air holes;
   wherein the photonic cavity is at least partially made of a photonic crystal, and the lattice constant of the photonic crystal is reduced or increased gradually in a central region of the photonic cavity, allowing light of a specific frequency to be trapped in the central region;
   wherein the OptoMEMS chip is flipped upside-down and bonded to the photonic chip.

2. The OptoMEMS according to claim 1, wherein the first platform is one of a SiN-on-Si platform, a SiN-on-$SiO_2$ platform, and the first platform is partially etched away to release the photonic cavity from the first platform.

3. The OptoMEMS according to claim 1, wherein the OptoMEMS chip and the photonic chip are bonded through a silicon spacer, and there is a gap between the two chips.

4. The OptoMEMS according to claim 1, wherein the second platform is a silicon-on-insulator (SOI) platform.

5. The OptoMEMS according to claim 4, wherein an insulator portion of the SOI platform is partially etched away to release the waveguide from the second platform.

6. The OptoMEMS according to claim 1, wherein the photonic cavity comprises two parallel dielectric beams that are substantially the same, and each of the two beams comprises at least one array of air holes.

7. The OptoMEMS according to claim 1, wherein a width of the waveguide is from 250 to 350 nm.

8. The OptoMEMS according to claim 1, wherein the waveguide of the photonic chip transports light, and light input to a first end of the waveguide is detectable at a second end of the waveguide, and the waveguide is elongated.

* * * * *